(12) United States Patent
Bordewyk et al.

(10) Patent No.: US 11,708,883 B1
(45) Date of Patent: Jul. 25, 2023

(54) ACTUATOR ASSEMBLY WITH ELECTRIC MOTOR FOR EXTENDING AND RETRACTING A PUSHER

(71) Applicant: Humphrey Products Company, Kalamazoo, MI (US)

(72) Inventors: Todd Bordewyk, Hudsonville, MI (US); Scott Davis, Kalamazoo, MI (US); Kurt Miedema, Kalamazoo, MI (US)

(73) Assignee: Humphrey Products Company, Kalamazoo, MI (US)

( * ) Notice: Subject to any disclaimer, the term of this patent is extended or adjusted under 35 U.S.C. 154(b) by 188 days.

(21) Appl. No.: 16/689,717

(22) Filed: Nov. 20, 2019

Related U.S. Application Data (60) Provisional application No. 62/769,759, filed on Nov. 20, 2018.

(51) Int. Cl.
*F16H 25/14* (2006.01)

(52) U.S. Cl.
CPC .................................. *F16H 25/14* (2013.01)

(58) Field of Classification Search
CPC ............... A47B 9/04; F16H 2025/2081; F16H 2025/204; F16H 25/2056; F16H 25/20; F16H 25/12; F16H 25/14; B65G 25/08; B65G 23/44; B65G 23/38; B65G 21/12; B65G 21/14; B65G 21/10
USPC ....................................................... 74/89.23
See application file for complete search history.

(56) References Cited

U.S. PATENT DOCUMENTS

| | | | | |
|---|---|---|---|---|
| 2,247,562 A | * | 7/1941 | Santen | F16D 65/14 74/59 |
| 3,118,315 A | * | 1/1964 | Loosli | F16H 7/14 198/816 |
| 4,137,784 A | * | 2/1979 | Griffin | B66F 3/08 254/103 |
| 4,254,928 A | * | 3/1981 | Huempfner | F16M 11/18 108/147 |
| 4,307,799 A | * | 12/1981 | Zouzoulas | B66F 3/08 192/141 |

(Continued)

FOREIGN PATENT DOCUMENTS

| | | | | |
|---|---|---|---|---|
| JP | 2005185091 A | * | 7/2005 | B25J 9/1674 |
| JP | 2013019487 A | * | 1/2013 | |

(Continued)

*Primary Examiner* — T. Scott Fix
(74) *Attorney, Agent, or Firm* — Gardner, Linn, Burkhart & Ondersma LLP (57) ABSTRACT

An apparatus for applying a force or action directed at interacting with or stopping a mechanism, or diverting an object. The apparatus includes a motor, a pusher, a drive shaft, and a retainer. The motor provides the force or action. The drive shaft is coupled to the motor and fitted within the pusher, and the pusher plate is coupled to the motor, with the pusher being fitted within the retainer. The pusher plate comprises an anti-rotation feature that prevents the pusher from rotating and converts the rotation motion of the drive shaft into a linear motion whereby the pusher is pushed out of the retainer, such as to engage, interact with or stop the mechanism. The pusher may be variously configured, such as in the form of a drive nut, ball assembly or roller assembly.

23 Claims, 11 Drawing Sheets

(56) References Cited

U.S. PATENT DOCUMENTS

| | | | | |
|---|---|---|---|---|
| 4,393,319 A | * | 7/1983 | Bock | F16K 31/048 |
| | | | | 310/83 |
| 4,609,179 A | * | 9/1986 | Chern | F16H 25/2056 |
| | | | | 254/102 |
| 5,530,332 A | * | 6/1996 | Rees | H02P 8/10 |
| | | | | 318/260 |
| 5,809,831 A | * | 9/1998 | Nagai | H02K 7/06 |
| | | | | 74/89.4 |
| 6,065,588 A | * | 5/2000 | Cotter | B65G 47/261 |
| | | | | 198/781.06 |
| 6,478,142 B2 | * | 11/2002 | Cotter | B65G 47/261 |
| | | | | 198/781.09 |
| 7,448,411 B2 | | 11/2008 | Friedman et al. | |
| 8,186,978 B2 | | 5/2012 | Tinholt et al. | |
| 8,528,597 B2 | | 9/2013 | Friedman et al. | |
| 8,794,266 B1 | | 8/2014 | Friedman et al. | |
| 9,494,245 B1 | | 11/2016 | Tinholt | |
| 9,863,513 B2 | * | 1/2018 | Rousseau | H02K 7/06 |
| 10,012,295 B2 | * | 7/2018 | Rousseau | F16H 25/20 |
| 10,228,072 B1 | | 3/2019 | Tinholt et al. | |
| 10,279,439 B1 | | 5/2019 | Tinholt | |
| 2006/0081078 A1 | * | 4/2006 | Nagai | F16H 25/2015 |
| | | | | 74/89.23 |
| 2009/0101475 A1 | * | 4/2009 | Nguyen | B65G 23/44 |
| | | | | 198/617 |

FOREIGN PATENT DOCUMENTS

| | | | | |
|---|---|---|---|---|
| WO | WO-02061922 A1 | * | 8/2002 | F16H 25/20 |
| WO | WO-2005067674 A2 | * | 7/2005 | B23K 11/31 |

\* cited by examiner

ACTUATOR ASSEMBLY WITH ELECTRIC MOTOR FOR EXTENDING AND RETRACTING A PUSHER

CROSS REFERENCE TO RELATED APPLICATION

The present application claims priority of U.S. provisional application Ser. No. 62/769,759 filed Nov. 20, 2018, which is hereby incorporated herein by reference in its entirety.

BACK GROUND AND FIELD OF THE INVENTION

The present invention is directed to actuators, and in particular, motor-driven actuator assemblies.

Conventional actuators are mechanisms used to interact with, control, or move another mechanism or system. Typically, actuators require an energy source that is converted into a controlled action and a controller or control signal for controlling the energy source and the desired action. The energy source may be provided by an electric current to power an electric motor, hydraulic fluid pressure, or pneumatic pressure. The control signal may be an electric signal provided by a controller, or some sort of pneumatic or hydraulic pressure applied to the actuator system.

SUMMARY OF THE INVENTION

Embodiments of the present invention provide an actuator apparatus in which motion of the actuator is used to apply a force or action, such as to provide an interacting and/or stopping force. The force may be applied through the use of an actuator assembly that translates a rotary motion into a linear motion. The mechanism may be a conveyor belt assembly or other similar assemblies. When the force or action, via the actuator assembly, is applied to the conveyor belt, the conveyor belt will be stopped until the force or action is released or reversed. Alternatively, the actuator assembly may be positioned such that the action or force blocks the path of a package travelling on a conveyor belt or other similar assembly.

In an aspect of the present invention, the actuator assembly comprises an electric motor that provides rotary motion to a drive shaft. The actuator assembly further comprises a pusher that is configured to receive the rotary motion (via a drive shaft coupling the drive nut to the electric motor) and to translate that rotary motion into a linear motion (via a pusher plate that prevents the drive nut from rotating). In the illustrated embodiments, the linear motion is applied to interact with or stop a conveyor belt or object being conveyed on a conveyor assembly, and the pusher may be configured as drive nut, a ball assembly or a roller assembly. It should be appreciated, however, that the actuator assembly of the present invention may be employed in other applications.

In another aspect of the present invention, the electric motor is one of a permanent magnet AC or DC motor, a field-excited AC or DC motor, and a stepper motor.

In an aspect of the present invention, the electric motor is controlled by a controller that supplies one or more control signals for controlling the application of the action or force.

In a further aspect of the present invention, one or more current sensors are used by the controller to control the application of the action or force.

An embodiment of the present information provides an apparatus for applying a linear motion to interact with or stop a mechanism. The apparatus includes a motor, a pusher, a drive shaft, and a pusher plate. The drive shaft is coupled to the motor and fitted within the pusher. The pusher plate is coupled to the motor. The pusher is fitted within the pusher plate. The pusher plate comprises an anti-rotation feature that prevents the pusher from rotating and converts the rotation motion of the drive shaft into a linear motion when the pusher is pushed out of the pusher plate, such that the pusher interacts with or stops the mechanism.

These and other objects, advantages, purposes and features of the present invention will become apparent upon review of the following specification in conjunction with the drawings.

DESCRIPTION OF THE PREFERRED EMBODIMENTS

The present invention will now be described with reference to the accompanying figures, wherein numbered elements in the following written description correspond to like-numbered elements in the figures. Embodiments of the present invention provide for an apparatus for applying a force or action directed at interacting with and/or stopping a mechanism. The force may be applied through the use of an actuator assembly that translates rotary motion into linear motion. In one of the illustrated embodiments, the mechanism comprises a conveyor belt assembly. When the force or action, via the actuator assembly, is applied to the conveyor belt, the conveyor belt will be stopped, such as via disengaging the conveyor belt from a roller, until the force or action is released or reversed. Alternatively, in another illustrated embodiment, the actuator assembly may be positioned such that the action or force blocks the path of a package travelling on a conveyor belt or other similar assembly, without affecting the conveyor belt itself. It should be appreciated that the actuator assembly may be used in alternative manners and for alternative applications.

Figure 1:
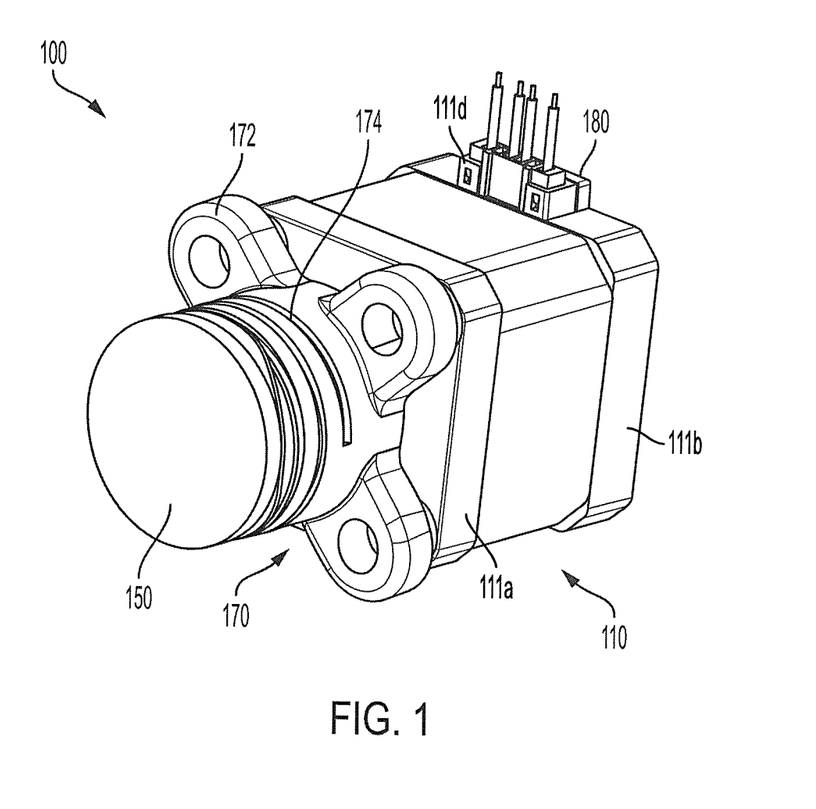
FIG. 1 is a perspective view of an actuator assembly in accordance with aspects of the present invention.
Figure 2:
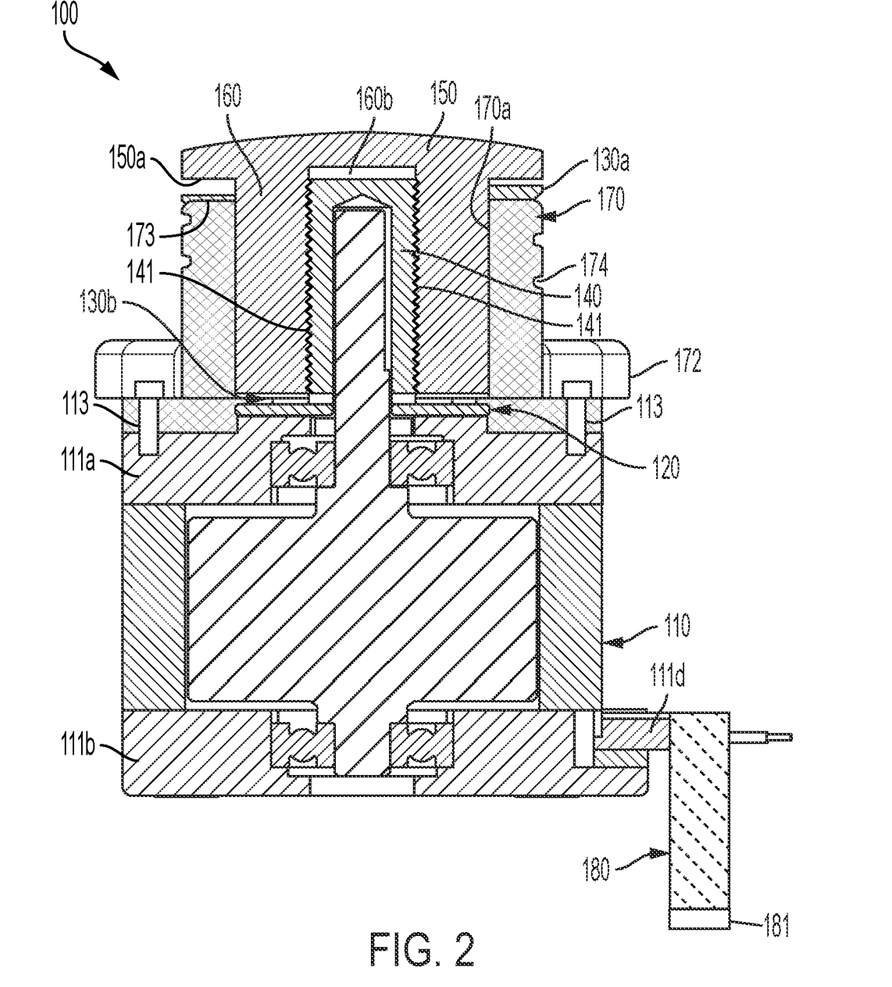
FIG. 2 is a cross-sectional view of the actuator assembly of FIG. 1.
Figure 3:
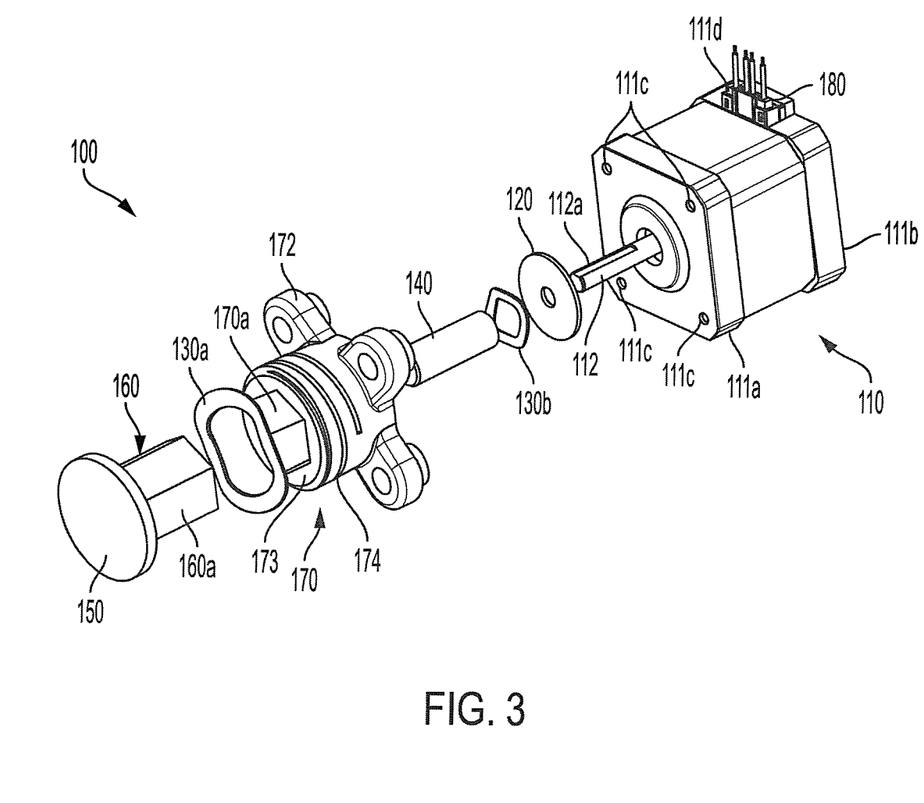
FIG. 3 is an exploded view of the actuator assembly of FIG. 1 in accordance with the present invention.

Referring to FIGS. 1-3, an exemplary actuator assembly 100 comprises an electrical drive motor 110 that includes a rotationally driven drive motor shaft 112, with the motor shaft 112 being engaged with a drive shaft 140 whereby rotation of the motor shaft 112 imparts rotation to the drive shaft 140. Assembly 100 further includes a retainer or mount or pusher plate 170 and an extendable and retractable arm, which is configured as a pusher or drive nut 160 in the illustrated embodiment. The drive motor 110 is secured to the pusher plate 170, with the pusher plate 170 in turn configured to enable the assembly 100 to be engaged with or mounted to a retaining device, such as a component of a conveyor belt assembly as discussed below. In operation, drive motor 110 imparts rotational motion to drive shaft 140, which is engaged via threads to drive nut 160 to thereby impart linear extension and retraction motion to drive nut 160, with drive nut 160 including a cap or head 150 that is used to impart a force, such as a lifting force to a conveyor belt or a stopping force to an object being conveyed on a conveyor assembly when drive nut 160 is in an extended orientation.

In the illustrated embodiment, motor 110 includes a pair of upper and lower housing plates 111a and 111b forming the frame of the motor 110. Upper plate 111a includes apertures 111c for use in mounting pusher plate 170 and motor 110 together. Lower plate 111b includes an electrical connector 111d via which wires for controlling motor 110 are accessible, and in particular via which a controller 180 is connectable to motor 110.

Assembly 100 further includes a thrust member or bearing 120 disposed between the housing plate 111a of motor 110 and the pusher plate 170, where the thrust bearing 120 includes an aperture through which the motor shaft 112 extends. The thrust bearing 120 allows the rotational force being generated by the motor 110 to be directed to the drive shaft 140 by decreasing the resistance between the drive shaft 140 and housing plate 111a, and reduces the load on the motor shaft 112 and/or bearings of the motor 110. The thrust bearing 120 may be, for example, a thrust washer, a ball bearing unit, or the like.

The actuator assembly 100 may further include one or more energy absorbing members or dampers, where in the illustrated embodiment an upper damper 130a and a lower damper 130b are utilized that are configured as wave washers. Alternatively, however, the dampers 130a, 130b may be configured as springs, such as coil springs, or still further as a Bellville washer, or an elastomeric disk.

The dampers operate as progressive braking mechanisms by providing an increasing resistance at the retraction and/or extension ends of the stroke of the drive nut 160. For example, the "increasing resistance" is used to provide a smooth current control "ramp" at the return end of a selected length of linear motion, also referred to as a "stroke." In the illustrated embodiment the energy absorbing member 130a is disposed between the bottom surface 150a of the cap 150 and the upper surface of the pusher plate 170, and the energy absorbing member 130b is disposed between the lower end of the drive shaft 140 and the thrust washer 120. (See FIGS. 2 and 3). Although two such dampers 130a, 130b are shown in the illustrated embodiment, it should be appreciated that only one such damper at either stroke end may be employed in a particular embodiment, if required.

As discussed herein, the current levels may be monitored by one or more current sensors or controllers. The controller may be integrated with the actuator assembly itself, such as via a processor within the motor assembly, and/or a separate external controller 180 may be employed. Still further, a linear position monitor or feedback sensor may be provided, such as an encoder or other linear position feedback device. Such a linear position sensor may be incorporated into the drive mechanism, including incorporated into the controller 180. This can provide additional loading changes in relation to speed and position can then be adjusted to tune or adapt the speed and/or torque required as well as anticipate, predict or estimate a required deceleration or stop. During the stop phase, minimizing peak load on the actuator also improves durability for long cycle life. Moreover, the controller may increase the speed during a segment of the travel wherein there is no load. That is, for example, prior to the stopping phase.

In an aspect of the present invention, the energy absorbing members 130a, 130b provide a "soft landing." As described herein, controller 180 monitors the current level such that a current control ramp is used to stop the motor 110 as the current "ramps" up. That is, as movement of the drive nut 160 and/or drive shaft 140 contacts the respective energy absorbing members, the current draw of the motor 110 will increase. As the current ramps up, the controller 180 will stop the motor 110 when the current reaches a threshold level. The energy absorbing member 130 gives a "cushion" and provides for a longer and shallower current ramp such that the current sensor 181 is better able to monitor the ramping current. Such an energy absorbing member 130 allows the current level to ramp more gradually such that the controller 180 stops the motor 110 instead of just letting the motor 110 run into a hard stop (as the engagement cap 150/drive nut 160 is retracting while the motor 110 is run in reverse to reverse the linear motion). The energy absorbing member 130 thereby provides for more flexibility in mounting and arrangement of the actuator 100. Alternatively and/or additionally, the controller 180 may be programmed for slowing/stopping the motor 110 when the actuator 100 has moved a selected stroke length, such as for example via monitoring rotation of the drive shaft, monitoring activation time, or otherwise. The sensing of current and adjustability as it relates to positioning allows increased sensitivity to reduction in impacts (high loading) and results in increased durability and reduced wear on all parts of the drive system.

In a further aspect of the present invention, an additional energy absorbing member 130 may be placed between the engagement cap 150 and the drive nut 160 to provide an extension cushion. For example, the engagement cap 150 may be configured as a separate component connected with the elongate body or stem or shaft extension 160a of the drive nut 160 with an energy absorbing member 130 disposed there between. Such an energy absorbing member 130 is thus able to provide a longer and shallower current ramp in like manner as discussed above when the drive shaft 140 is extended and the cap 150 comes in contact or is stopped by an object. When coupled with a conveyor system in a configuration where the cap 150 is used to displace a conveyor belt from a roller, a conventional conveyor belt has a sufficient amount of compliance in it to provide a similar cushioning effect when the cap 150 is extended whereby such an additional energy absorbing member 130 is not required.

As further understood from FIG. 2, the exemplary illustrated drive shaft 140 includes helical features in the form of mating threads 141, with external threads on the outside surface or diameter of the drive shaft 140 for engaging with internal threads on the internal surface of the cylindrical cavity 160b of drive nut 160. In an aspect of the present invention, the drive shaft 140 may utilize a variety of thread forms, such as but not limited to a V thread, a buttress thread, an ACME thread, a ball screw, and a multi-start fast thread. The pitch of the thread(s) may be selected to optimize the speed and torque required by the linear motion. Drive shaft 140 is secured to the motor drive shaft 112 whereby rotation of shaft 112 imparts motion to drive shaft 140. In turn, as discussed below, the shaft extension 160a of drive nut 160 is prohibited from rotation within the pusher plate 170 whereby rotation of drive shaft 140 will cause drive nut 160 to be extended and retracted via threads 141.

The drive shaft 140 may utilize an interference fit onto the motor shaft 112, or be retained with a set screw, or the drive shaft 140 may be secured to the motor shaft 112 via other forms of connection. For example, in the illustrated embodiment the motor shaft 112 includes a flat portion 112a extending along a portion of the length of the shaft 112, where the flat portion 112a engages with a corresponding internal flat on the inner bore of the drive shaft 140. Still further, an alternative threaded motor shaft may be provided that engages with internal threads of a drive bore, such as where the drive shaft feature is fixed to or integrally part of a drive nut.

As also illustrated in FIGS. 2 and 3, the drive nut 160 is configured to translate the rotary motion of the drive shaft 140 into a linear motion. As discussed herein, the linear motion may be used on a conveyor system, such as to interact with or brake a conveyor belt or to assist in stopping or diverting objects while being conveyed. It should be appreciated, however, that actuator 100 may be utilized with other systems and for other purposes. In an aspect of the present invention, the drive nut 160 has an anti-rotation feature for converting the rotational motion into linear motion. In the illustrated embodiment, for example, the longitudinally extending elongate body portion 160a of the drive nut 160 has a hexagonal external profile that engages with a corresponding internal hexagonal profile or bore or cavity 170a of the pusher plate 170. It should be appreciated that bore 170a and body 160a may be alternatively configured and still prevent rotation of the drive nut 160 relative to the pusher plate 170. For example, the anti-rotation feature may include, but is not limited to, flats, splines, lobes, keys, and the like, including arrangements that are not hexagonal. The anti-rotational feature may be symmetrical about the centerline of the drive nut 160, or asymmetrical about the centerline, allowing positioning an additional feature to another unique radial or linear location. As noted, in an aspect of the present invention, the drive nut 160 may or may not be incorporated with the head 150 forming the drive cap/engagement feature. For example, a head may be a separate component from a body portion of a drive nut, with such a head and body portion being connected together.

As illustrated in FIGS. 1-3, the head 150 may be configured to have a domed surface or cap as shown that allows some misalignment when extended to contact a surface or object, or may alternatively have a flat surface or cap. Still further, the head 150 may have an attached or interlocked interface. If the cap 150 is not interlocked, the drive nut 160 and cap 150 may be replaced from the actuator assembly 100 simply by running the drive shaft 140 to eject the cap 150 and drive nut 160, and then re-threading a new cap 150 and drive nut 160 into place by running motor 110 in the opposite direction.

As illustrated in FIGS. 2 and 3 and noted above, the drive nut 160 is constrained by the pusher plate 170. An exemplary pusher plate 170 may incorporate several functions. For example, the pusher plate 170 may provide the drive nut 160 with an anti-rotation housing, as discussed above, where the geometry of the pusher plate 170 allows linear sliding motion, but not rotary motion of the drive nut 160. Additional variations may allow different indexing options and positions between the pusher plate 170 and the drive nut 160. In an aspect of the present invention, a stroke length of the actuator 100 may be a selected length, such as one quarter inch. Other stroke lengths are possible.

In the illustrated embodiment the pusher plate 170 includes multiple molded motor mounts 172 that are integrally part of the pusher plate 170 (see FIGS. 1-3). As illustrated in FIGS. 2 and 3, the motor mounts 172 include mounting holes that match the apertures 111c on the motor plate 111a mounting interface and thus eliminate the need for a separate mounting component. In the illustrated embodiment the motor mounts 172 comprise tabs having apertures there through, where the pusher plate 170 is securable to the drive motor 110 by fasteners 113 that engage with the frame member 111a of the motor 110.

Figure 2A:
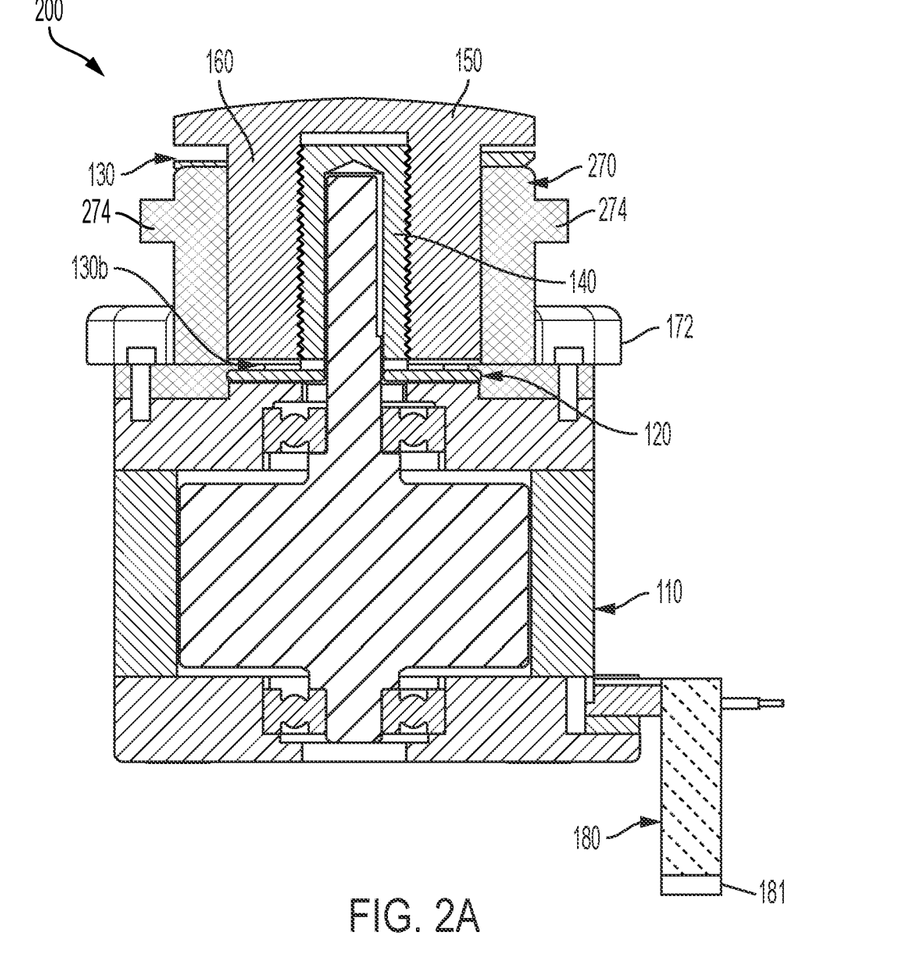
FIG. 2A is a cross-sectional view of an alternative actuator assembly in accordance with the present invention.
Figure 4A:
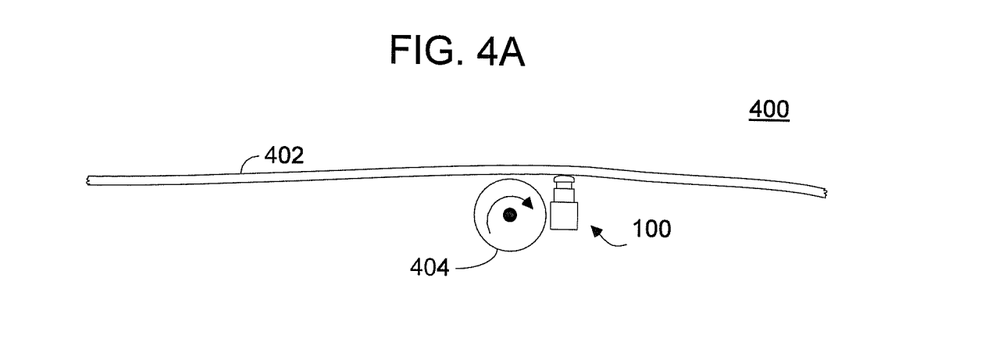
FIG. 4A is a side elevational view of an exemplary actuator assembly braking a conveyor belt in accordance with an aspect of the present invention.
Figure 4B:
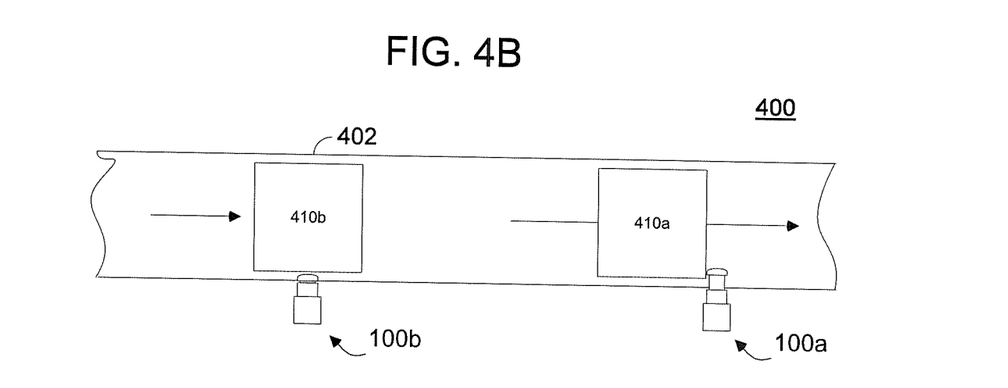
FIG. 4B is a top-down view of a pair of exemplary actuator assemblies interacting with objects being conveyed on a conveyor assembly in accordance with another aspect of the present invention.

In a further aspect of the present invention, the pusher plate 170 further comprises assembly mounting features or connectors 174 for mounting the actuator assembly 100 to another component, such as to a conveyor system 400 as shown in FIG. 4B. In the illustrated embodiment the connector 174 is formed as an external thread on the longitudinal exterior surface of pusher plate 170 where the pusher plate 170 has a circular cross sectional outer profile that includes helical grooves comprising the threads. The actuator assembly 100 may thus be fixed to a structure, such as to a conveyor assembly component, such as a frame member, a female connector component, or the like, by threading the grooves of the pusher plate 170 into corresponding mating helical threads. The pusher plate 170 may be alternatively constructed to employ alternative connectors to engage with and mount to a structure other than via the illustrated external threads, such as via an alternatively configured profile or attachment mechanisms. For example, the external surface may include quarter turn bayonet locks or lugs, integral mounting bosses, cam locks or the like. As shown in FIG. 2A, for example, an alternative actuator assembly 200 is shown having an alternative retainer or pusher plate 270 that includes external connectors 274 configured as outwardly extending lugs that may be used for engaging actuator assembly 200 to a mounting structure. In the illustrated embodiment, actuator assembly 200 is otherwise substantially similar to actuator assembly 100 discussed herein.

As noted above, the actuator assembly 100 further includes a controller 180. In an aspect of the present invention, the controller 180 may be interfaced with the motor 110 via connector 111d, such as by a motor plug, or simply hard wired to the motor 110 directly. In the illustrated embodiment controller 180 includes a current sensor 181 for monitoring a current level of the motor 110 and is configured to interact with the changing current level, that is the current control ramp, to control the motor 110. Alternatively, a current sensor may be arranged between the motor 110 and the controller 180. In addition to or alternatively, the controller 180 may be configured to control the motor 110 via count control, such as by way of monitoring the rotations of shaft 112 when using a stepper motor, or by way of end stop control, or by time controlled operation such as based on a known number of rotations that will occur within a set time, as well as other application-specific methods.

FIGS. 4A and 4B illustrate an exemplary conveyor system 400 fitted with one or more actuator assemblies 100. The actuator assembly 100 may be positioned at the conveyor system 400 such that its linear motion is used to brake a conveyor belt 402 of the conveyor system 400. As illustrated in FIG. 4A, linear motion of the actuator assembly 100 may be used to lift the conveyor belt 402 away from a drive roller 404. Lifting the conveyor belt away from the motive force of the drive roller 404 will "brake" the conveyor belt 402. As discussed herein, the cap 150 may be configured to conform to the conveyor belt 402 and act against it.

As illustrated in FIG. 4B, the actuator assembly 100 may be located in an alternative position, such that the linear motion of the actuator assembly 100 may be used to interact with and stop the motion of a package 410a. As illustrated in FIG. 4B, the actuator assembly 100a is linearly extended or at the end of its "stroke," and stops package 410a (while the conveyor belt 402 continues moving below it), while because actuator assembly 100b is not linearly extended (and at a home or reversed position), the package 410b will be moved by the conveyor belt 402 past the actuator assembly 100b. In an aspect of the present invention, packages 410 may be selectively stopped at visual inspection stations or for other similar stations where packages may need to be selectively stopped.

Figure 5:
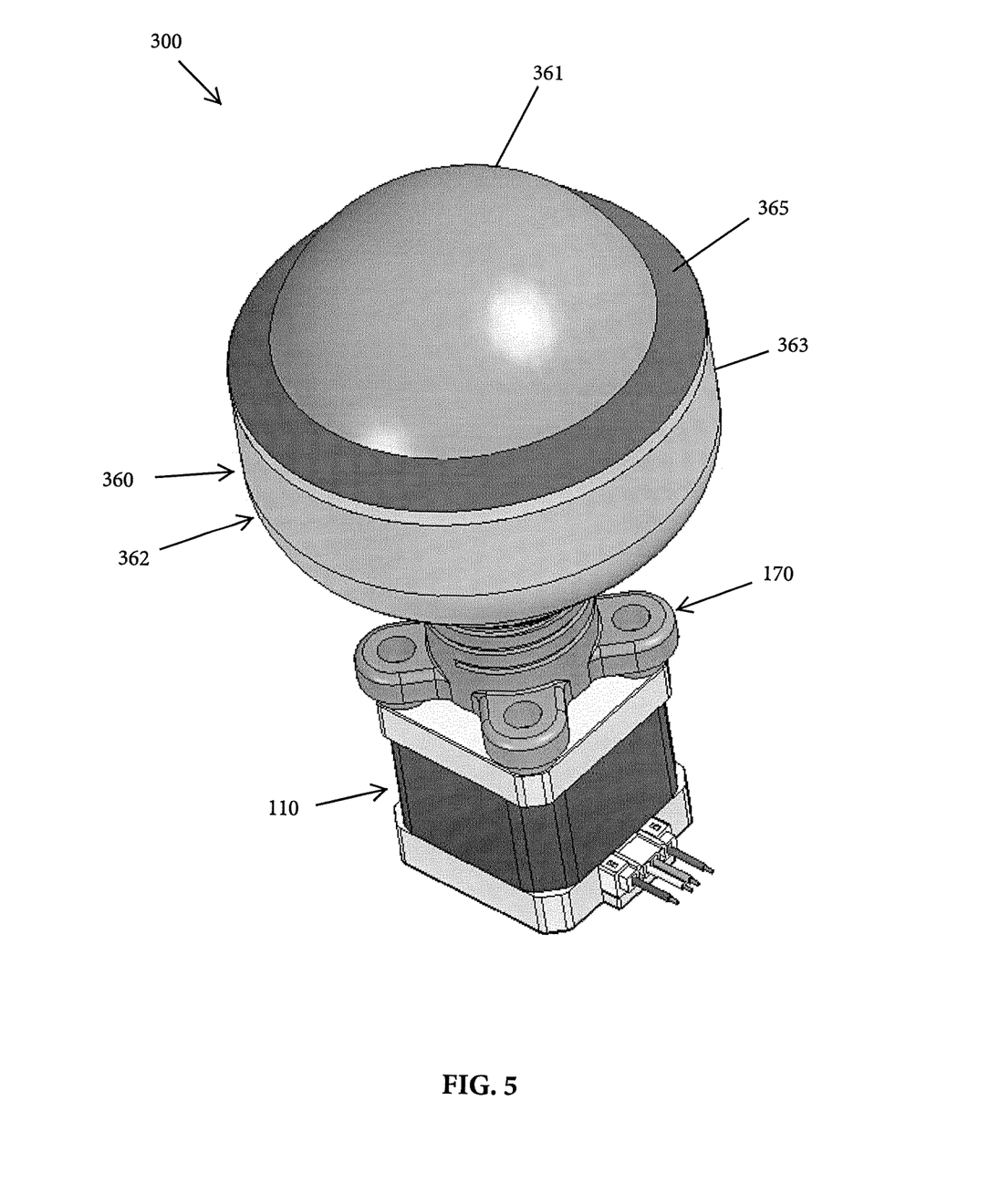
FIG. 5 is a perspective view of an alternative actuator assembly embodiment in accordance with aspects of the present invention.
Figure 6:
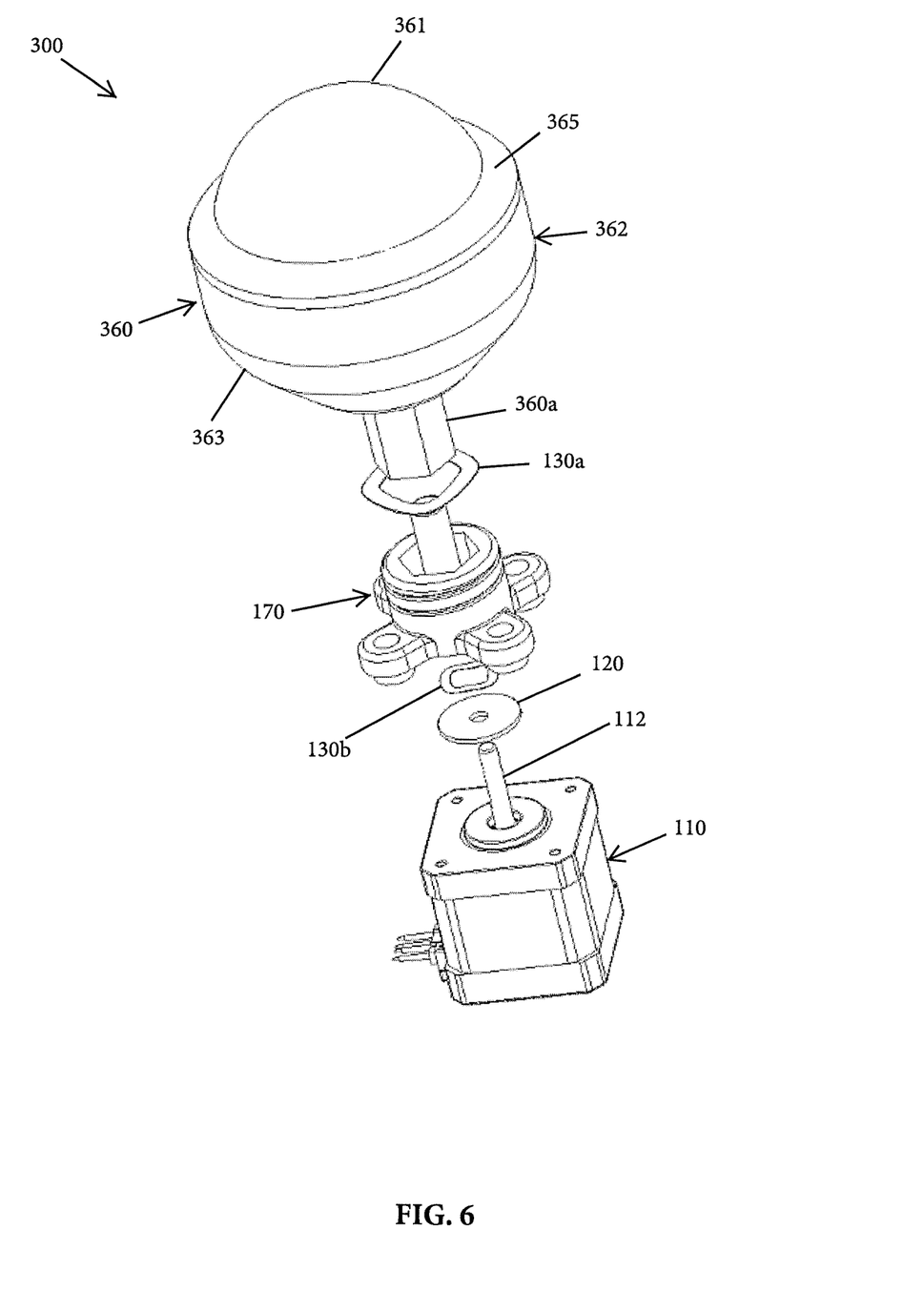
FIG. 6 is an exploded perspective view of the actuator assembly of FIG. 5.
Figure 7:
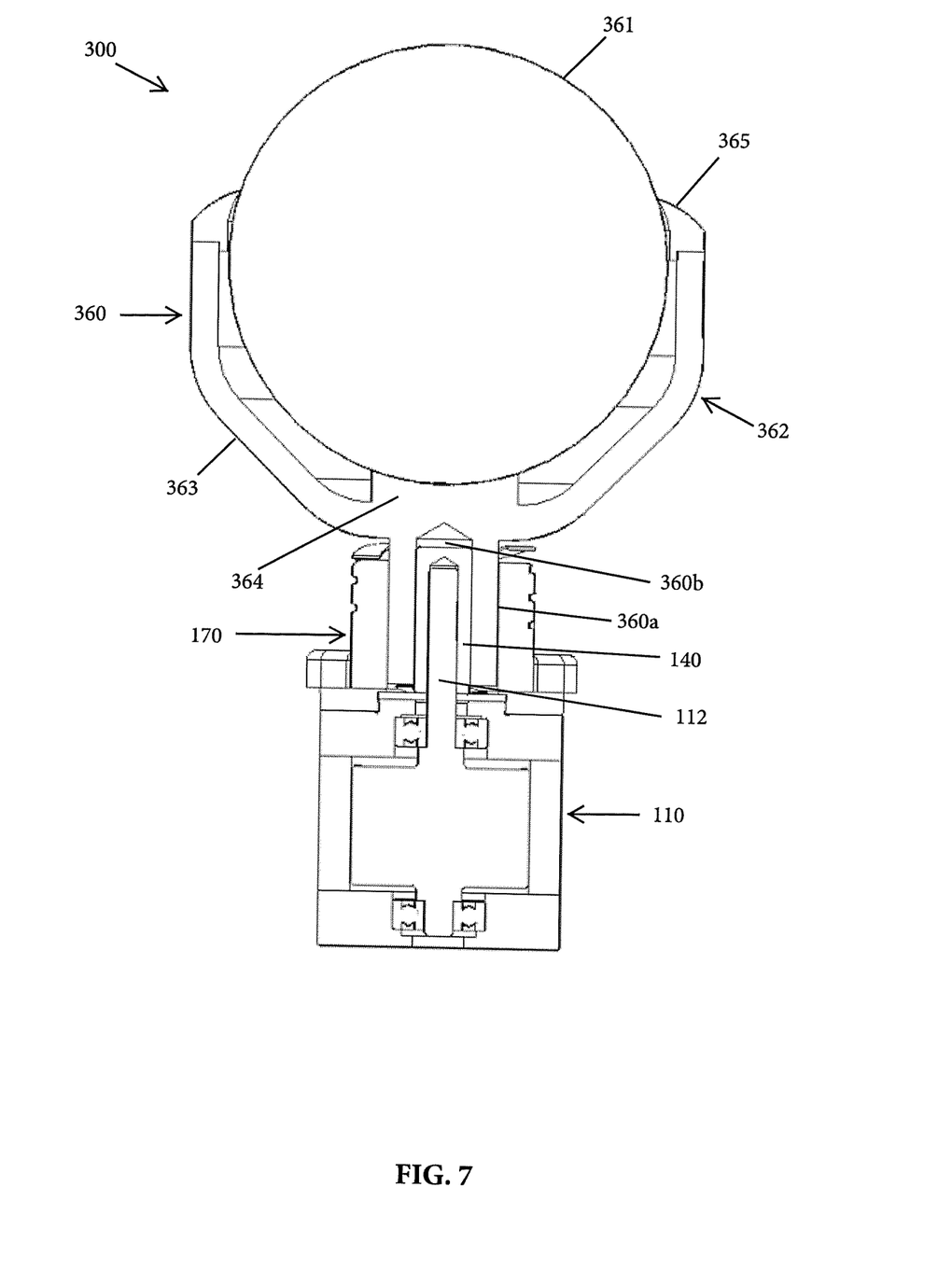
FIG. 7 is a cross-sectional view of the actuator assembly of FIG. 5.

Referring now to FIGS. 5 to 7, an alternative actuator assembly 300 is illustrated that shares construction and features with actuator assemblies 100 and 200 discussed above, such that like reference numbers are used with corresponding components in actuator assembly 300 relative to actuator assemblies 100 and 200. Due to the similarities, not all of the components and features of actuator assembly 300 are discussed in detail in the following discussion. Actuator assembly 300, however, includes an alternative pusher constructed as an extendable and retractable rotational ball assembly 360. Similar components of the pusher of ball assembly 360 to the pusher of drive nut 160 are discussed herein with "200" added to the reference numerals relative to those of drive nut 160.

As understood from FIGS. 5 and 7, ball assembly 360 is retained within retainer 170 that is mounted to drive motor 110, whereby rotation of drive motor 110 will cause the ball assembly 360 to extend and retract relative to retainer 170. Actuator assembly 300 may be employed, for example, to extend ball assembly 360 in contact with the underside of a conveyor belt such as to raise the belt out of contact with a drive mechanism of the conveyor system, such as a drive roller or the like. As discussed below, the ball 361 of the ball assembly 360 contacts the belt and the spherical nature of the ball allows for self-adjustment at the ball/belt interface, where the ball 361 is enabled to rotate within the ball holder 362.

With further reference to FIGS. 6 and 7, ball holder 362 of ball assembly 360 is shown to include a ball cup portion 363 and a body or stem 360a. Stem 360a has a hexagonal outer configuration whereby flat surfaces of the stem 360a mate with the corresponding flat internal surfaces of the hexagonal profile of cavity 170a of the pusher plate 170 to preclude rotation of the ball holder 362 relative to retainer 170. As noted, ball 361 is able to rotate within the ball cup 363, with ball cup 363 being provided with a support post 364 having a smaller concave surface matching the spherical radius of the ball 361 upon which the lower portion of the ball 361 rests to thereby limit frictional drag and allow the ball 361 to rotate with a minimum of drag while under load. Ball cup 363 additionally includes a lip seal 365 at an upper edge of ball cup 363. The lip seal 365 is disposed about a circumference of the ball 361 to provide support and centering of the ball 361, as well as inhibit debris from entering into the ball cup 363.

As understood from FIG. 7, stem 360a includes an internal cylindrical cavity 360b into which drive shaft 140 is disposed. In like manner to internal cavity 160b above, the cavity 360b and drive shaft 140 for actuator assembly 300 are threadably connected (see threads 141 FIG. 2). As such, rotation of the motor drive shaft 112 and corresponding rotation of drive shaft 140 imparts linear longitudinal motion to ball assembly 360 for extension and retraction.

In like manner to actuator assembly 100, actuator assembly 300 includes dampers 130a, 130b, and a thrust bearing 120, and may be used with a controller 180. Still further, retainer 170 includes an exterior connector in the form of threads 174 for mounting to a structure.

Figure 8:
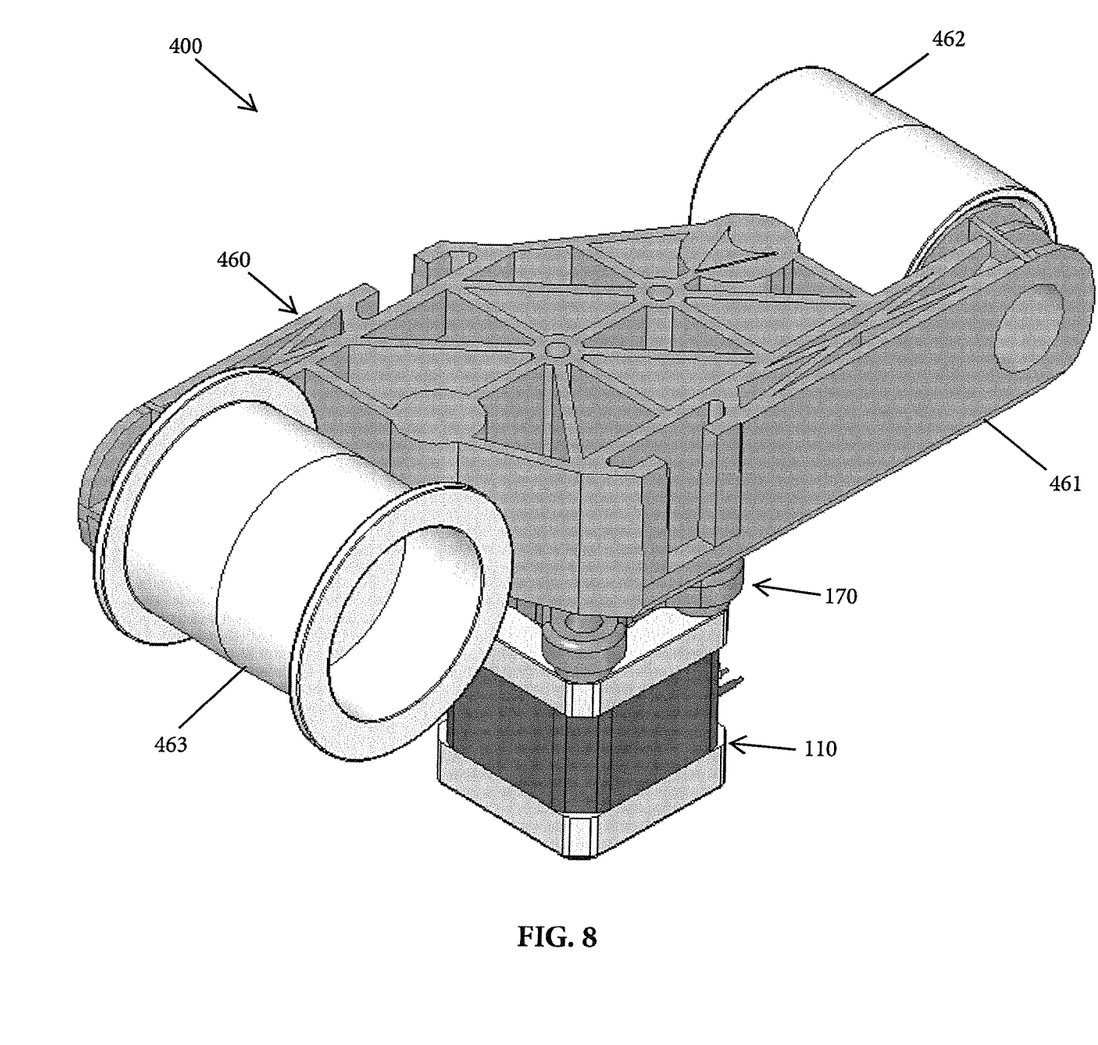
FIG. 8 is a perspective view of another alternative actuator assembly embodiment in accordance with aspects of the present invention.
Figure 9:
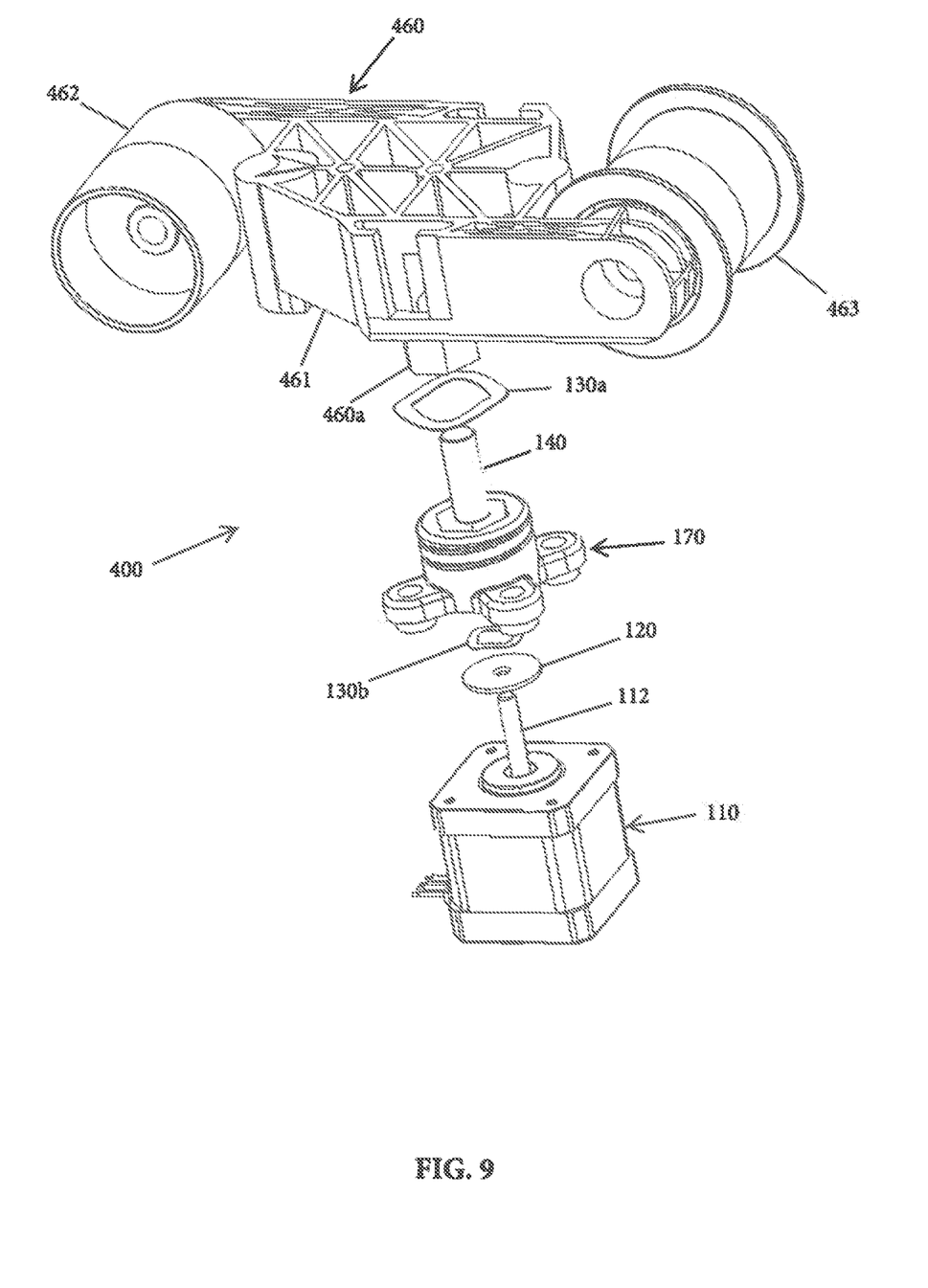
FIG. 9 is an exploded perspective view of the actuator assembly of FIG. 8.
Figure 10:
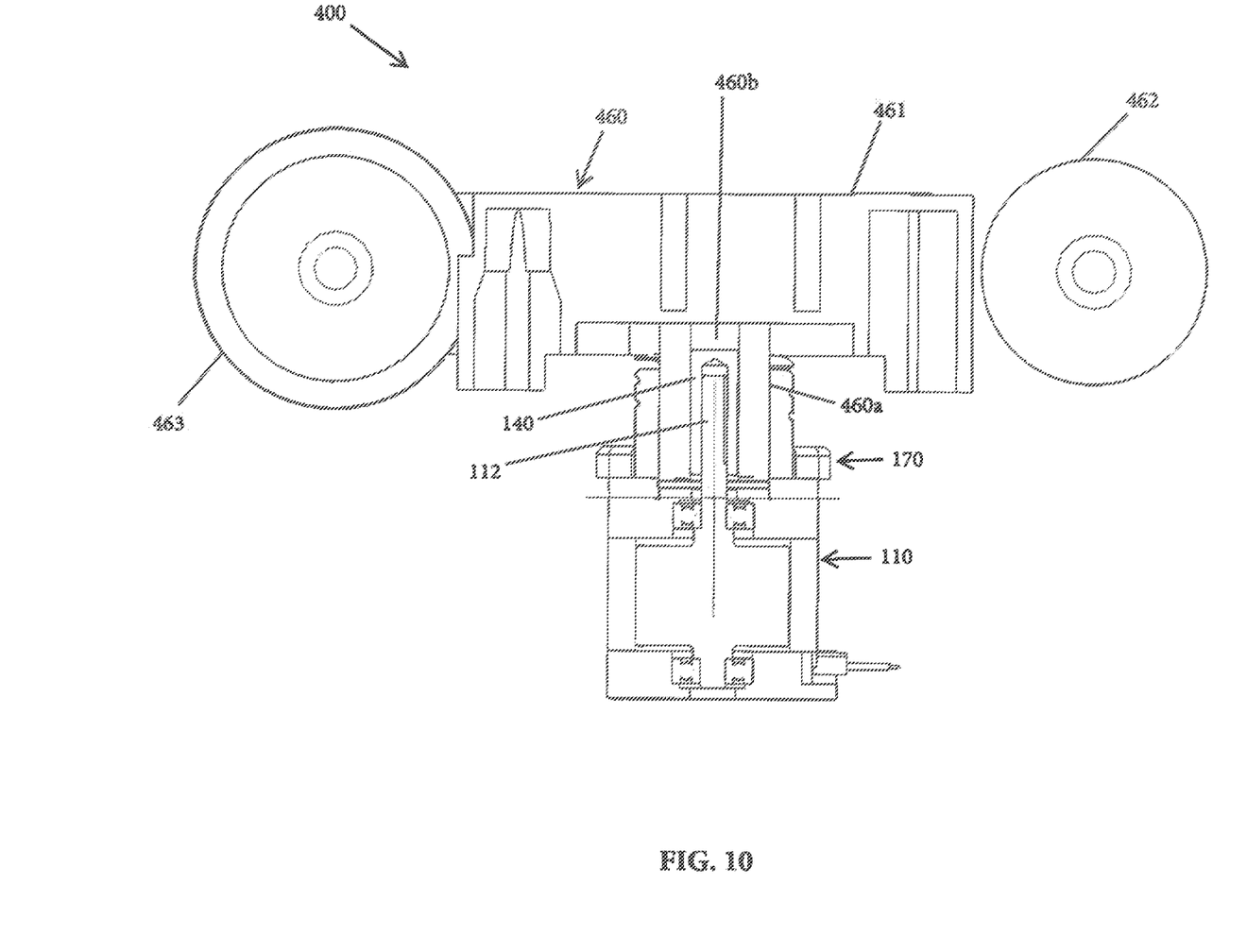
FIG. 10 is a cross-sectional view of the actuator assembly of FIG. 8.

Referring now to FIGS. 8 to 10, another alternative actuator assembly 400 is illustrated that shares construction and features with actuator assemblies 100, 200 and 300 discussed above, such that like reference numbers are used with corresponding components in actuator assembly 400 relative to actuator assemblies 100, 200 and 300. Due to the similarities, not all of the components and features of actuator assembly 400 are discussed in detail in the following discussion. Actuator assembly 400, however, includes an alternative pusher constructed as an extendable and retractable skate or roller assembly 460. Similar components of the pusher of roller assembly 460 to the pusher of drive nut 160 are discussed herein with "300" added to the reference numerals relative to those of drive nut 160.

As understood from FIGS. 8 and 10, roller assembly 460 is retained within retainer 170 that is mounted to drive motor 110, whereby rotation of drive motor 110 will cause the roller assembly 460 to extend and retract relative to retainer 170. Actuator assembly 400 may be employed, for example, to extend roller assembly 460 into contact with the underside of a conveyor belt such as to raise the belt out of contact with a drive mechanism of the conveyor system, such as a drive roller or the like.

With further reference to FIGS. 8 to 10, roller assembly 460 includes a molded frame or platform 461 integrated with a body or stem 460a. Stem 460a has a hexagonal outer configuration whereby flat surfaces of the stem 460a mate with the corresponding flat internal surfaces of the hexagonal profile of cavity 170a of the pusher plate 170 to preclude rotation of the ball holder 362 relative to retainer 170. Platform 461 in turn includes a pair of rollers 462, 463 that contact and lift the belt of a conveyor, where the rollers 462, 463 are mounted for rotation on platform 461 via parallel shafts. As illustrated, roller 463 may be provided with outer radially extending guides at the ends of roller 463, which may for example be used to maintain the retention or tracking of the belt.

As understood from FIG. 10, stem 460a includes an internal cylindrical cavity 460b into which drive shaft 140 is disposed. In like manner to internal cavity 160b above, the cavity 460b and drive shaft 140 for actuator assembly 400 are threadably connected (see threads 141 FIG. 2). As such, rotation of the motor drive shaft 112 and corresponding rotation of drive shaft 140 imparts linear longitudinal motion to roller assembly 460 for extension and retraction.

In like manner to actuator assembly 100, actuator assembly 400 includes dampers 130a, 130b, and a thrust bearing 120, and may be used with a controller 180. Still further, retainer 170 includes an exterior connector in the form of threads 174 for mounting to a structure.

In an aspect of the present invention, a variety of motors may be utilized. For example, a permanent magnet electric motor may be used. Such an electric motor may provide a fast response and more torque than an equivalently sized stepper motor. A permanent magnet electric motor may have a higher cost than a stepper motor of the same size, especially when the stepper motor is ball bearing fitted as is usual. Such permanent magnet electric motors may be AC or DC motors.

In the alternative, stepper motors may be employed. Stepper motors may also provide an additional "locking" or maintained function with a much lower level of power than when in motion. The power speed/torque can be "tuned" to the braking application (linear motion of the actuator) or other application, allowing a higher speed at the beginning of the linear motion or stroke when the braking load is at a lower or minimum level, and an increased torque with slower speed at the end of the stroke when more linear force is required.

Alternatively, the motor may be a field-excited electric motor where a current running through field coils produces the magnet field of the motor's rotor. Field excited AC motors typically are larger and have a lower life expectancy than the electric motors discussed above. Field-excited electric motors may come in either AC or DC arrangements.

In an aspect of the present invention, an exemplary drive shaft 140 and drive nut 160 may be coupled via helical thread forms 141 that may be as simple as a screw thread, or as complex as a multi-start, custom thread form. The thread form on the drive shaft 140 may be either external or internal with respect to the drive nut 160 to engage the drive shaft 140. An exemplary thread pitch and form may be adjusted to the application of the actuator assembly 100. Using a pitch requiring many revolutions to provide an exemplary set distance will increase the mechanical force, while less pitch would increase the rate for a set distance. Various thread forms may provide an optimal wear/speed combination for the actuator application. The materials for the drive shaft 140 and/or drive nut 160 may be machined or molded, dissimilar, and incorporate additional coatings or additives to increase performance relative to wear and friction.

Therefore, exemplary embodiments of a system for applying a force or action directed at interacting with or stopping a mechanism, may be adapted to a particular application and cost. For example, the force or action may be implemented with an electric motor-driven actuator with an electric motor selected for the particular cost/application, while the thread form between a particular drive shaft and drive nut of the actuator may be selected for the application as well. As discussed herein, the actuator may be housed in an assembly for coupling to a conveyor system such that the linear action of the actuator interacts with (e.g., blocking the progress of a package) or stops a conveyor belt of the conveyor system.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. An actuator assembly, said actuator assembly comprising:
   a motor having a rotationally driven motor shaft, said motor comprising an upper housing plate with said motor shaft extending through said upper housing plate;
   a retainer directly mounted to said upper housing plate of said motor, said retainer including an internal retainer bore into which said motor shaft extends;
   a pusher, said pusher including a longitudinal stem extending into said retainer bore and a portion opposite said motor that extends from said stem out of said retainer bore and comprises an extending portion, wherein said extending portion includes a bottom pusher surface that extends beyond a periphery of said stem, and wherein said retainer includes an upper retainer surface disposed beneath said bottom pusher surface of said extending portion, and wherein said stem includes a bottom stem surface and an internal cavity that opens at said bottom stem surface with said motor shaft extending into said internal cavity;
   wherein said pusher is configured to be longitudinally extended and retracted relative to said retainer bore via rotation of said motor shaft with said stem constrained from rotation relative to said retainer bore, and further comprising one or more dampers configured to engage with said pusher to provide a progressive braking effect to movement of said pusher via increasing resistance, and comprising a current sensor configured to sense and measure a current level associated with the motor and further comprising a controller configured to control the motor, wherein the controller is further configured to control the motor as defined by the measured current level; and
   wherein said one or more dampers is disposed either between said bottom pusher surface of said extending portion of said pusher and said upper retainer surface of said retainer, or between said bottom stem surface and said upper housing plate.

2. The actuator assembly of claim 1, wherein said one or more dampers comprises an upper damper and a lower damper, with said upper damper disposed between said bottom surface of said extending portion of said pusher and said upper retainer surface of said retainer, and with said lower damper disposed between said bottom stem surface and said upper housing plate.

3. The actuator assembly of claim 1, further comprising a drive shaft mounted to said motor shaft for rotation with said motor shaft, wherein said drive shaft extends into said internal cavity of said stem.

4. The actuator assembly of claim 3, wherein said drive shaft includes an outer surface and said internal cavity of said stem includes an inner surface, and wherein said outer surface engages with said inner surface via threads whereby rotation of said drive shaft imparts longitudinal driving motion to said pusher.

5. The actuator of claim 3, further including a thrust bearing disposed between said upper housing plate of said motor and said drive shaft.

6. The actuator assembly of claim 1, wherein said retainer bore includes at least one flat surface and said stem includes at least one flat surface, and wherein said flat surface of said stem mates with said flat surface of said retainer bore to constrain rotation of said pusher within said retainer bore.

7. The actuator assembly of claim 1, wherein said retainer includes an external surface and wherein said external surface includes a connector for mounting said actuator assembly.

8. The actuator assembly of claim 7, wherein said connector comprises one of a thread or a lug.

9. The actuator assembly of claim 1, wherein said pusher comprises a drive nut with said portion of said pusher comprising a head with said stem extending from said head.

10. The actuator assembly of claim 1, wherein said pusher comprises a ball assembly with said portion of said pusher comprising a spherical ball retained within a ball holder whereby a portion of said ball extends from said ball holder, and with said stem extending from said ball holder opposite said extending portion of said ball.

11. The actuator assembly of claim 1, wherein said pusher comprises a roller assembly with said portion of said pusher comprising a pair of rollers mounted to a frame and having axes of rotation that are perpendicular to the longitudinal extension and retraction of said pusher.

12. The actuator assembly of claim 1, wherein said one or more dampers is configured as one of a spring, a wave washer, a Bellville washer, or elastomeric disk.

13. An actuator assembly, said actuator assembly comprising:
- a motor having a rotationally driven motor shaft, said motor comprising a frame member disposed about said motor shaft with said motor shaft extending through said frame member;
- a retainer mounted to said frame member of said motor, said retainer including an internal retainer bore into which said motor shaft extends;
- a pusher, said pusher including a longitudinal stem extending into said retainer bore and a portion opposite said motor that extends from said stem out of said retainer bore and comprises an extending portion, wherein said extending portion includes a bottom pusher surface that extends beyond a periphery of said stem, and wherein said retainer includes an upper retainer surface disposed beneath said bottom pusher surface of said extending portion, and wherein said stem includes a bottom stem surface and an internal cavity that opens at said bottom stem surface with said motor shaft extending into said internal cavity;
- wherein said pusher is configured to be longitudinally extended and retracted relative to said retainer bore via rotation of said motor shaft with said stem constrained from rotation relative to said retainer bore, and further comprising one or more dampers configured to engage with said pusher to provide a progressive braking effect to movement of said pusher via increasing resistance, and comprising a current sensor configured to sense and measure a current level associated with the motor and further comprising a controller configured to control the motor, wherein the controller is further configured to control the motor as defined by the measured current level;
- wherein said one or more dampers is disposed either between said bottom pusher surface of said extending portion of said pusher and said upper retainer surface of said retainer, or between said bottom stem surface and said upper housing plate; and
- wherein said frame member includes motor apertures and said retainer includes retainer apertures, and wherein said retainer apertures align with said motor apertures with said retainer and said motor being mounted together via fasteners at said retainer apertures and said motor apertures.

14. The actuator assembly of claim 13, wherein one of said one or more dampers is configured to be contacted by said pusher when said pusher is retracted to a closed position, and wherein said controller is configured to monitor the current of said motor during operation with said controller configured to stop rotation of said motor shaft upon detecting that said pusher is in contact with said damper based on the monitored current of said motor.

15. The actuator assembly of claim 14, wherein one of said one or more dampers comprises a wave washer.

16. The actuator assembly of claim 14, wherein said one or more dampers comprises an upper damper and a lower damper, with said upper damper disposed between said bottom surface of said extending portion of said pusher and said upper retainer surface of said retainer, and with said lower damper disposed between said bottom stem surface and said upper housing plate.

17. The actuator assembly of claim 16, wherein said upper damper and said lower damper comprise wave washers.

18. The actuator assembly of claim 13, further comprising a drive shaft mounted to said motor shaft for rotation with said motor shaft, wherein said drive shaft extends into said internal cavity of said stem, wherein said drive shaft includes an outer surface and said internal cavity of said stem includes an inner surface, and wherein said outer surface engages with said inner surface via threads whereby rotation of said drive shaft imparts longitudinal driving motion to said pusher, and further including a thrust bearing disposed between said frame member of said motor and said drive shaft.

19. An apparatus for applying a force, the apparatus comprising:
- a motor having a rotationally driven motor shaft, said motor comprising an upper housing plate with the motor shaft extending through the upper housing plate;
- a pusher comprising a stem and a roller assembly with the roller assembly comprising a pair of rollers mounted to a frame and having axes of rotation that are perpendicular to a longitudinal extension of said stem;
- a drive shaft coupled to the motor shaft and fitted within the stem of the pusher;
- a pusher plate coupled to the upper housing plate of the motor, wherein the stem of the pusher is fitted within the pusher plate for longitudinal extension and retraction via rotation of the motor shaft; and
- wherein the pusher plate comprises an anti-rotation feature that prevents the pusher from rotating and converts the rotation motion of the drive shaft into a linear motion when the pusher is pushed out of the pusher plate for contacting a conveyor belt, and further comprising one or more dampers configured to engage with said pusher to provide a progressive braking effect to movement of said pusher via increasing resistance, and comprising a current sensor configured to sense and measure a current level associated with the motor and further comprising a controller configured to control the motor, wherein the controller is further configured to control the motor as defined by the measured current level;
- wherein said one or more dampers is disposed either between the frame of the roller assembly and an upper surface of the pusher plate or between a lower surface of the stem and the upper housing plate of the motor.

20. The apparatus of claim 19, wherein said one or more dampers is configured as one of a spring, a wave washer, a Bellville washer, or elastomeric disk.

21. The apparatus of claim 20, wherein said one or more dampers comprises an upper damper and a lower damper with the upper damper arranged between the frame of the roller assembly and the pusher plate and the lower damper arranged between the stem and the upper housing plate of the motor.

22. The apparatus of claim 19, wherein the drive shaft is fitted within the pusher via a threaded connection.

23. The apparatus of claim 19, wherein the pusher plate comprises a plurality of molded motor mounts configured to couple the pusher plate to the motor.

\* \* \* \* \*